United States Patent
Attaluri et al.

(10) Patent No.: US 9,740,714 B2
(45) Date of Patent: Aug. 22, 2017

(54) MULTILEVEL FILTERS FOR CACHE-EFFICIENT ACCESS

(71) Applicant: International Business Machines Corporation, Armonk, NY (US)

(72) Inventors: Gopi K. Attaluri, San Jose, CA (US); Ronald J. Barber, San Jose, CA (US); Naresh K. Chainani, Portland, OR (US); Vijayshankar Raman, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 584 days.

(21) Appl. No.: 14/174,366

(22) Filed: Feb. 6, 2014

(65) Prior Publication Data
US 2015/0220573 A1 Aug. 6, 2015

(51) Int. Cl.
*G06F 17/30* (2006.01)
*H04L 29/06* (2006.01)

(52) U.S. Cl.
CPC .. *G06F 17/30303* (2013.01); *G06F 17/30483* (2013.01); *H04L 67/42* (2013.01)

(58) Field of Classification Search
CPC ......... G06F 17/30339; G06F 17/30286; G06F 17/30324; G06F 17/3033; G06F 17/30445; G06F 17/30595; G06F 17/30091; G06F 17/30289; G06F 17/30303; G06F 17/30982; G06F 17/30699; G06F 17/30867; G06F 17/30949; G06F 9/5016; H04L 67/42; H04L 45/7453; H04L 43/026

USPC ................. 707/764, E17.059, E17.089, 754, 707/E17.046, 690

See application file for complete search history.

(56) References Cited

U.S. PATENT DOCUMENTS

| | | | |
|---|---|---|---|
| 5,867,799 A * | 2/1999 | Lang | G06F 17/30702 |
| 7,930,547 B2 | 4/2011 | Hao et al. | |
| 8,032,732 B2 | 10/2011 | Beyer et al. | |
| 8,145,642 B2 | 3/2012 | Cruanes et al. | |

(Continued)

OTHER PUBLICATIONS

Papapetrou, O. et al.; "Cardinality estimation and dynamic length adaptation for Bloom filters"; Distributed and Parallel Databases, vol. 28, No. 2-3, pp. 119-156; Dec. 2010.

(Continued)

*Primary Examiner* — Robert Beausoliel, Jr.
*Assistant Examiner* — Pedro J Santos
(74) *Attorney, Agent, or Firm* — Robert C. Bunker; Edell, Shapiro & Finnan, LLC (57) ABSTRACT

According to one embodiment of the present invention, a system with a plurality of memories, generates a first filter associated with a first memory, and generates one or more second filters each associated with a corresponding memory. Each second filter is generated with a size at least partially accommodated within the storage capacity of the associated memory. The system determines absence of items from a set by selectively probing the generated filters in an ascending order of data access speed to the associated memories and aborts further probing for an item in response to a probe indicating that the item is absent from the set. Embodiments of the present invention further include a method and computer program product for testing set membership in substantially the same manners described above.

19 Claims, 5 Drawing Sheets

(56) References Cited

U.S. PATENT DOCUMENTS

| | | | |
|---|---|---|---|
| 8,209,368 B2 | 6/2012 | Beyer et al. | |
| 8,484,438 B2 | 7/2013 | Cypher | |
| 8,548,987 B2 | 10/2013 | Rauser et al. | |
| 2001/0020245 A1* | 9/2001 | Golds | G06F 9/445 718/102 |
| 2005/0086520 A1* | 4/2005 | Dharmapurikar | H04L 63/145 726/4 |
| 2006/0117036 A1 | 6/2006 | Cruanes | |
| 2009/0031082 A1 | 1/2009 | Ford et al. | |
| 2009/0307193 A1* | 12/2009 | Ganjikunta | G06F 11/3688 |
| 2010/0082648 A1 | 4/2010 | Potapov et al. | |
| 2010/0332765 A1* | 12/2010 | Cypher | G06F 12/0811 711/141 |
| 2011/0131198 A1 | 6/2011 | Johnson et al. | |
| 2011/0225182 A1* | 9/2011 | Tsuchiya | G06F 17/3033 707/769 |
| 2012/0072656 A1 | 3/2012 | Archak | |
| 2013/0036277 A1 | 2/2013 | Szczepkowski et al. | |
| 2013/0166576 A1* | 6/2013 | Hudzia | G06F 17/30324 707/754 |
| 2013/0173853 A1 | 7/2013 | Ungureanu et al. | |
| 2014/0025684 A1* | 1/2014 | Hess | G06F 17/30699 707/741 |
| 2014/0067830 A1* | 3/2014 | Buhler | G06F 19/22 707/749 |
| 2014/0143271 A1* | 5/2014 | Klotzer | G06F 17/3048 707/769 |
| 2014/0143498 A1* | 5/2014 | Olson | G06F 12/0802 711/132 |
| 2014/0351518 A1* | 11/2014 | Chang | G06F 12/0811 711/122 |
| 2015/0220570 A1 | 8/2015 | Attaluri et al. | |
| 2016/0034531 A1 | 2/2016 | Barber et al. | |
| 2016/0034587 A1 | 2/2016 | Barber et al. | |

OTHER PUBLICATIONS

Chitrapura, KP. et al.; "Method and System for Response Prediction using Collaborative Filtering with Hierarchies and Side-Information"; An IP.com Prior Art Database Technical Disclosure; http://ip.com/IPCOM/000213589D; Dec. 22, 2011.

Spi DST et al.; "Resource-Efficient Parallel Algorithms"; An IP.com Prior Art Database Technical Disclosure; http://ip.com/IPCOM/000150512D; Apr. 18, 2007.

Wang et al.; "CasAB: Building Precise Bitmap Indices Via Cascaded Bloom Filters", IEEE/ICICSE 4th International Conference on, Dec. 21-22, 2009, pp. 85-92.

Kim et al.; "Sort Vs. Hash Revisited: Fast Join Implementation on Modern Multi-Core CPUs", ACM/Proceedings of the VLDB Endowment, vol. 2, Iss. 2, Aug. 2009, pp. 1378-1389.

Michael Mitzenmacher; "Bloom Filters: A History and Modern Applications", www.eecs.harvard.edu/~michaelm/TALKS/NewZealandBF.ppt, accessed Feb. 2014, 45 pages.

CompArch; "Bloom Filters", http://semipublic.comp-arch.net/wiki/Bloom_Filters, accessed Jun. 2013, 4 pages.

Georgia Koloniari and Evaggelia Pitoura; "Bloom-Based Filters for Hierarchical Data", http://www.google.com/url?sa=t&rct=j&q=&esrc=s&source=web&cd=1&cad=rja&ved=0CC8QFjAA&url=http%3A%2F%2Fciteseerx.ist.psu.edu%2Fviewdo0/02Fdownload%3Fdoi%3D10.1.1.64.1694%26rep%3Drep1%26type%3Dpdf&ei=bodDUZgnKPHZyQH6rYHgDQ&usg=AFQjCNFs2Ef2wshTkzTRoUQ1k4YgB3mwcw&bvm=bv.43828540,d.aWc, 12 pages.

List of IBM Patents or Patent Applications Treated as Related, Sep. 30, 2016, 1 page.

Adina Crainiceanu, Bloofi: a hierarchical Bloom filter index with applications to distributed data provenance. In Proceedings of the 2nd International Workshop on Cloud Intelligence (Cloud-I '13) (Aug. 26, 2013). ACM, New York, NY, USA, Article 4, 8 pages. DOI=http://dx.doi.org/10.1145/2501928.2501931.

* cited by examiner

MULTILEVEL FILTERS FOR CACHE-EFFICIENT ACCESS

BACKGROUND

1. Technical Field

Present invention embodiments relate to accessing set membership information, and more specifically, to cache-efficient access of set membership information using multilevel data structures to identify non-matching rows of database tables for join or other operations.

2. Discussion of the Related Art

Filters are data structures that may be used in testing whether an element is a member of a set. The results of the test indicate either that the element is not in the set or is possibly in the set. In other words, false positive matches are possible, but false negatives are not. Examples of filters include Bloom filters, counting filters, compact approximators, and related objects.

Filters may be used in a relational database management system (RDBMS) to improve the speed of a join operation by filtering out outer table rows that lack matching inner table rows without having to access a larger data structure such as a hash table. In this context, the filter is sometimes referred to as a "join filter." Typically, a join filter takes the form of a bitmap of hash values for join keys of the inner table.

A larger filter will tend to produce fewer collisions and therefore fewer false positive results than a smaller filter. However, random look-ups into a very large data structure may result in cache misses, thereby reducing or negating the speed improvement provided by the filter.

BRIEF SUMMARY

According to one embodiment of the present invention, a system with a plurality of memories, generates a first filter associated with a first memory, and generates one or more second filters each associated with a corresponding memory. Each second filter is generated with a size at least partially accommodated within the storage capacity of the associated memory. The system determines absence of items from a set by selectively probing the generated filters in an ascending order of data access speed to the associated memories and aborts further probing for an item in response to a probe indicating that the item is absent from the set. Embodiments of the present invention further include a method and computer program product for testing set membership in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments pertain to multilevel, cache-efficient filters. In particular, a multilevel filter comprises a plurality of filters, each sized to fit within a corresponding memory level of a hierarchical memory structure. For example, a computer system may have a 32 kilobyte (KB) level one (L1) cache, 256 KB L2 cache, 4 megabyte (MB) L3 cache, and one or more gigabytes (GB) of local random access memory (RAM). A filter in the form of a bitmap of size 32 MB fits in the local RAM but exceeds the capacity of the L3 cache. According to an embodiment of the present invention, three additional filters may be generated with smaller bitmaps corresponding to the three cache levels. For example, each bit in the L3-sized filter may represent 8 consecutive bits of the 32 MB filter; each bit in the L2-sized filter may represent 128 consecutive bits of the L3-sized filter; and each bit in the L1-sized filter may represent 8 consecutive bits of the L2-sized join-filter. The original filter and the three additional filters together make up a multilevel filter. To perform a membership test, the individual filters or levels are probed in order of smallest to largest. If the result from a level is negative—indicating that the element is not a member of the set—higher levels are not probed.

Individual levels of a multilevel filter may be any type of filter—that is, any data structure that may be used to test whether an element is a member of a set, where the result of the test indicates either that the element is not in the set or is possibly in the set. For example, the data structure may be a bitmap for rows of a join operation and built by initializing the bits to zero. For each element of the set (e.g., each join key from an inner table of the join operation), a hash function is applied to that element, and the resulting hash value is used as an address of a bit in the bitmap, which is set to one to indicate the presence of a corresponding row. To test whether an item (e.g., a join key from an outer table of the join operation) is a member of the set, the hash function may be applied to the item and the corresponding bit at the address represented by the resulting hash value is examined. If the value of the bit is zero, the item is not in the set. If the value of the bit is one, the item is possibly in the set: that is, the item may be in the set or there may have been a hash collision.

An individual level of a multilevel filter may use more than one hash function. For example, a bitmap may be built by applying each hash function to each element of the set, and setting to one each bit in the bitmap corresponding to the resulting hash values. To test whether an item is a member of the set, the hash functions may be applied to the item and the bits corresponding to the resulting hash values are examined. If any of the corresponding bits is zero, the item is not in the set. If all of the corresponding bits are one, the item is possibly in the set.

One or more levels may be omitted when the multilevel filter is built, or may be temporarily disabled at runtime when the multilevel filter is probed, if they are ineffective (for instance, a level may have a low rate of negative results because it is densely populated or suffers from too many hash collisions).

One aspect of a present invention embodiment is to make the time-cost of probing a join filter affordable in relational databases deployed in large data warehouse environments or other so-called Big Data environments where join filter sizes are typically large. Data of the smaller, more frequently probed filter levels become available in the smaller, faster caches (to an extent that may depend, e.g., on the efficiency of the levels).

Figure 1:
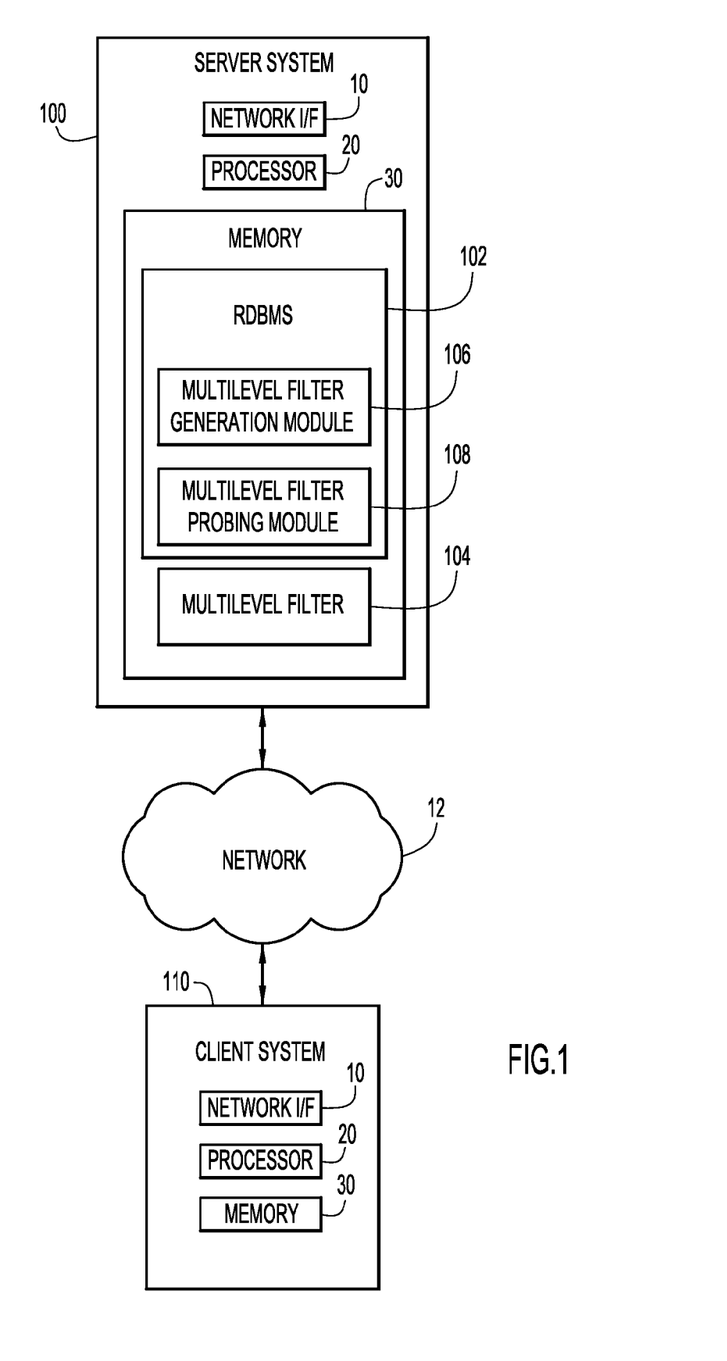
FIG. 1 is a diagrammatic illustration of an example computing environment for an embodiment of the present invention.

With reference now to the figures, an example environment for present invention embodiments is illustrated in FIG. 1. Specifically, the environment includes one or more server systems 100 and one or more client or end-user systems 110. Server systems 100 and client systems 110 may be remote from each other and communicate over a network 12.

Network 12 may be implemented by any number of any suitable communications media (e.g., wide area network (WAN), local area network (LAN), Internet, intranet, etc.). Alternatively, any number of server systems 100 and client systems 110 may be local to each other, and communicate via any appropriate local communication medium (e.g., local area network (LAN), hardwire, wireless link, intranet, etc.).

A server system 100 may include a relational database management system (RDBMS) 102 (or other server process or application) and multilevel filter 104. By way of example, multilevel filter 104 may be a join filter. The RDBMS and multilevel filter may be implemented across plural server systems. Alternatively, RDBMS 102 and multilevel filter 104 may reside on a client system 110 or other computer system in communication with the client system.

Client systems 110 enable users to communicate with the RDBMS (e.g., via network 12). The client systems may present any graphical user (e.g., GUI, etc.) or other interface (e.g., command line prompts, menu screens, etc.) to receive commands from users and interact with the RDBMS module and/or other modules or services.

Server systems 100 and client systems 110 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., RDBMS module software).

The RDBMS may include multilevel filter generation module 106, multilevel filter probing module 108, and one or more other modules or units to perform the various functions of present invention embodiments described below (e.g., performing join operations, hashing join keys or other values, generating individual filter levels, probing individual filter levels, dynamically disabling a level of a multilevel filter, etc.), may be implemented by any combination of any quantity of software and/or hardware modules or units, and may reside within memory 30 of a server system and/or client systems for execution by processor 20.

Figure 2:
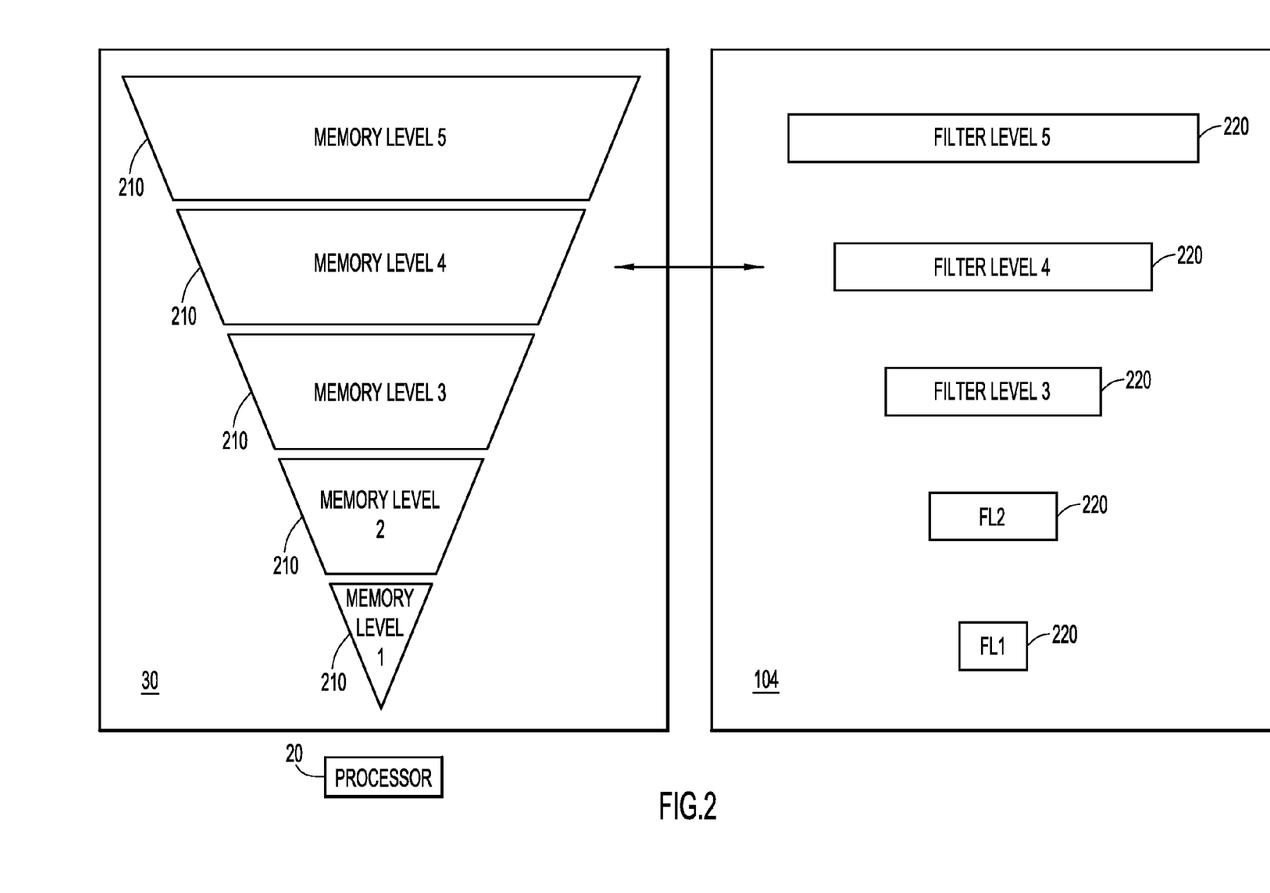
FIG. 2 is a block diagram of an example memory hierarchy and corresponding multilevel filter according to an embodiment of the present invention.

A block diagram of an example memory hierarchy and corresponding multilevel filter according to an embodiment of the present invention is illustrated in FIG. 2. Memory 30 is hierarchically structured and comprises two or more memory levels 210, which may be for description purposes numbered 1, 2, . . . n based on size, where lower numbered layers have lower storage capacity than higher numbered layers. Alternatively, the memories may be numbered based on access time. Typically, processor 20 accesses each lower numbered or smaller memory layers faster than each higher numbered or larger memory layers. For example, memory levels 1, 2, and 3 may be levels of a cache hierarchy, while memory level 4 is a main system random access memory (RAM). In a multiprocessor system using a non-uniform memory access (NUMA) memory design with three levels of cache per processor core, level 4 may designate local memory and level 5 may designate remote memory. In general, memory 30 may include any combination of two or more levels of any sizes, including any number of cache and/or other memory levels (e.g., one cache level, four cache levels, persistent memory (e.g., magnetic disk, optical disk, magnetic tape, etc.), remote memory (e.g., memory of a system connected via network 12), etc.), and may be labeled in any fashion.

Multilevel filter 104 comprises a plurality of filter layers 220 (each an individual filter) and has a structure corresponding (at least in part) to the structure of the memory hierarchy. For example, filter layers numbered 1, 2, . . . n may correspond to memory levels 1, 2, . . . n, where, by way of example, higher numbered filter layers are larger than lower numbered filter layers and a filter layer has a size that may fit within the corresponding memory level. The multilevel filter need not have a level corresponding to each level of the memory hierarchy.

Figure 3:
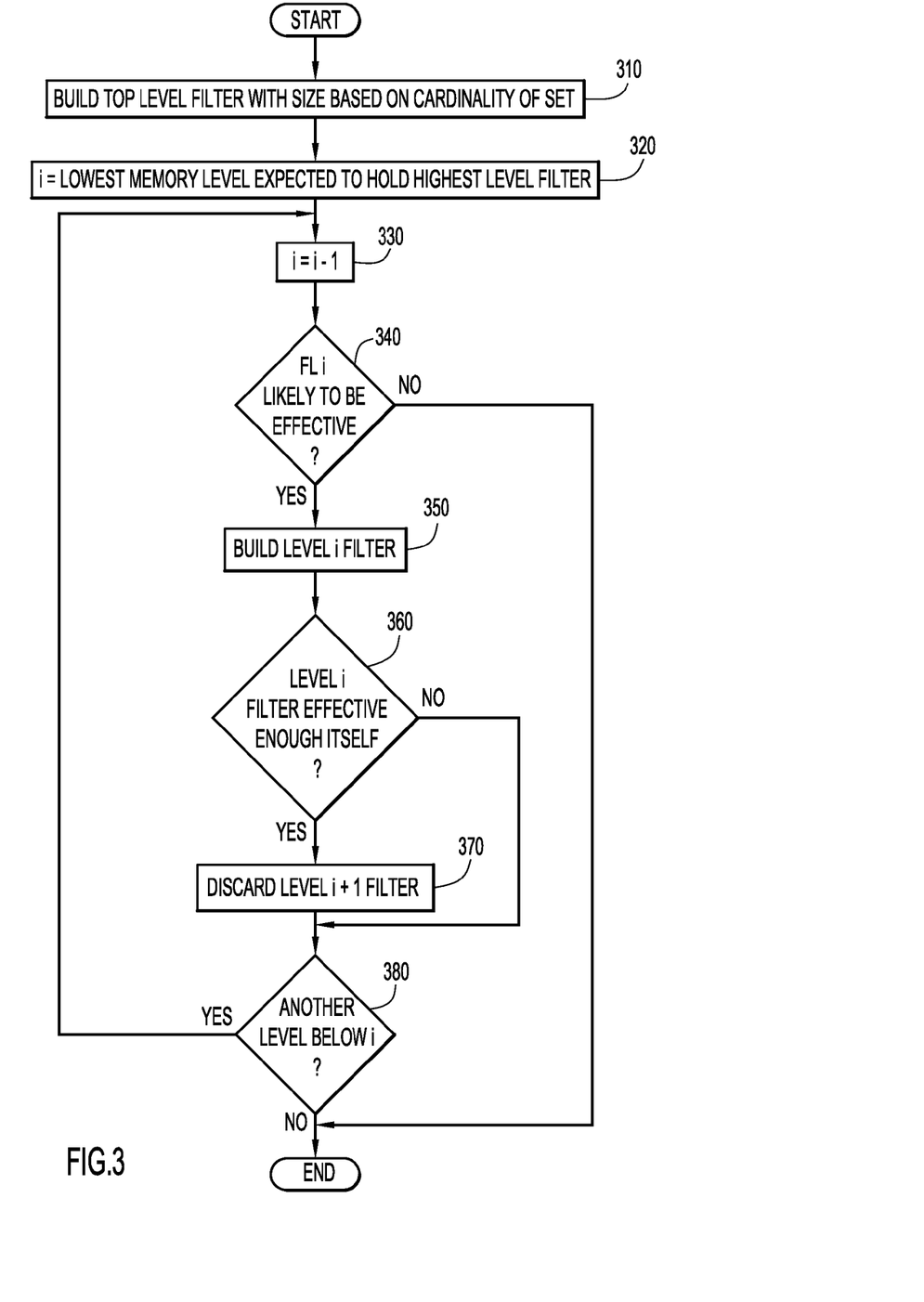
FIG. 3 is a flow diagram illustrating an example manner of building a multilevel filter according to an embodiment of the present invention.

An example manner of building a multilevel filter (e.g., via processor(s) 20 of server system 100 and multilevel filter generator module 106) according to an embodiment of the present invention is illustrated in FIG. 3. Initially, at step 310, the highest level of the filter is built. The size of this level of the filter may be based on the cardinality n of the set for which it will be used to test membership (e.g., the number of distinct join keys in an inner table of join operation). For example, the top level filter may be a Bloom filter with an m-bit bitmap using a predetermined number of hash functions k (e.g., 1, 2, 3, etc.), where m is approximately equal or proportional to $n \log_2 n$, subject to the condition that the bitmap fit within highest capacity memory level. Alternatively, m may be a selected value (e.g., set to a predetermined value) and k chosen to optimize the probability of false positive results (e.g., k may be set close to $$\frac{m}{n} \ln 2).$$

In general, the size of the highest filter level may be set in any manner, taking into account any factors, subject to the constraint that it fit within available memory.

Parallel processing may be used to build the highest level filter. For example, on a multi-processor system, shared memory may be allocated for a global copy of the filter, and the elements of the set may be partitioned among concurrent threads. Each thread fills a local copy of the bitmap (or other structure) by processing a subset of the elements and merges the local copy into the global copy (e.g., using bitwise OR operations to merge bitmaps). Once the global copy is built, the local copies are no longer needed and the memory consumed by them is released. If memory is too constrained (e.g., if the memory local to a processor cannot contain a copy of the entire bitmap), partitioning may be employed so that each thread builds only a part of the bitmap.

At step 320, the lowest memory level that has sufficient storage capacity to contain the highest filter level is determined. The number of this memory level may be assigned to a current level number i. For example, in a system with five levels of memory, the filter built in step 310 may be expected to fit within memory level four, in which case the current level number is i=4. At step 330, the next lowest level is considered. For example, the current level number i may be decremented by one.

At step 340, a pre-build analysis is performed to determine whether to build a new, smaller filter for the current level. The new filter level will have a size expected to fit or approximately fit within the current memory level i. For example, the new filter may use a bitmap of size equal to the capacity of memory level i. The new filter level will not be effective if most of the bits in its bitmask are set because the rate of false positive results will be too high and may be correlated with false positive results from the higher level filter. The pre-build analysis may estimate the number of bits that will be set in the new bitmap based on the size and number of bits set in the higher level filter. This may be done by using a model in which set bits will be uniformly distributed throughout the new bitmap. Alternatively, the pre-build analysis may directly count the number bits that will be set in the new bitmap (e.g., by scanning the higher level bitmap). The analysis may determine the new filter to be ineffective if the fraction of set bits in the new filter will be above a predetermined threshold (e.g., 40%, 60%, 80%, 95%, 99%, etc.). If it is determined that the new filter will not be effective, processing ends and no filter is built at the current or lower levels. Otherwise processing proceeds to step 350.

At step 350, a new, smaller filter is built to fit within the current memory level i. In one embodiment of the present invention, each bit of the new filter corresponds to r consecutive bits of the next highest level filter, where r is the ratio of the two filter sizes. For example, if the current memory level L3 has a capacity of 4 MB, and there is a filter at level four of size 32 MB, then r may be eight. A bit will be set in the new bitmap if any bit in the corresponding r bits of the higher level filter are set.

In a multiprocessor system, the new filter may be built in parallel by partitioning the higher level filter into a number of contiguous-bit segments equal to the number of threads to be used for processing. Each thread may work independently by sequentially reading its portion of the higher level filter and sequentially writing to its corresponding portion of the new filter. Since the threads may read and write without synchronization, the cost of creating the new filter may be rendered negligible in this manner.

Alternatively, a new filter may be built using different hash functions (or different hash bits of the same hash function) than used for the other filter levels. For example, a new smaller filter may be built in the same manner as the top level filter except that a new hash function is applied to the elements of the set to generate hash values used as addresses for the smaller filter, or a new smaller filter may be built in the same manner as the top level filter where low bits of the hash values are used as addresses for the top level filter and high bits of the hash values are used as addresses for the smaller filter. In this case, contiguous bits of the higher level filter will generally not correspond to the same bit in the smaller table. This may improve the effectiveness of the multilevel filter as a whole, however the improvement in effectiveness may come at the cost of increased build time due to additional hashing requirements and random writes. To probe a multilevel filter in which different hash functions are used for different layers, the hash function(s) for each of the filter levels may be applied in turn to the item being tested if a lower level of the filter has not indicated that the item is absent from the set.

At step 360, a post-build analysis determines whether the new, smaller filter at the current level is effective enough that the higher level filter may be discarded. For example, if the filter at the current level i costs p to probe and is expected to pass a fraction f of the elements (e.g., keys of an outer join table) tested against it, and a filter at level i+1 costs q to probe and is expected to pass a fraction g of the elements given the presence of the filter at level i, and the cost of processing an element that passes the filter at level i+1 is h, then the cost of using both the filter at level i and the filter at level i+1 is (p+fq+gh). Using the level i filter alone costs (p+fh). The costs (e.g., accesses times) and passing fractions may be estimated using standard techniques. If the cost of using the level i filter alone is expected to be less than the cost of using the level i filter and the higher level filter (e.g., level i+1 filter) together, then the higher level filter is discarded at step 370.

At step 380, processing ends if the there is no memory level below the current level. Otherwise, processing returns to step 330 and continues for the next lower level.

Figure 4:
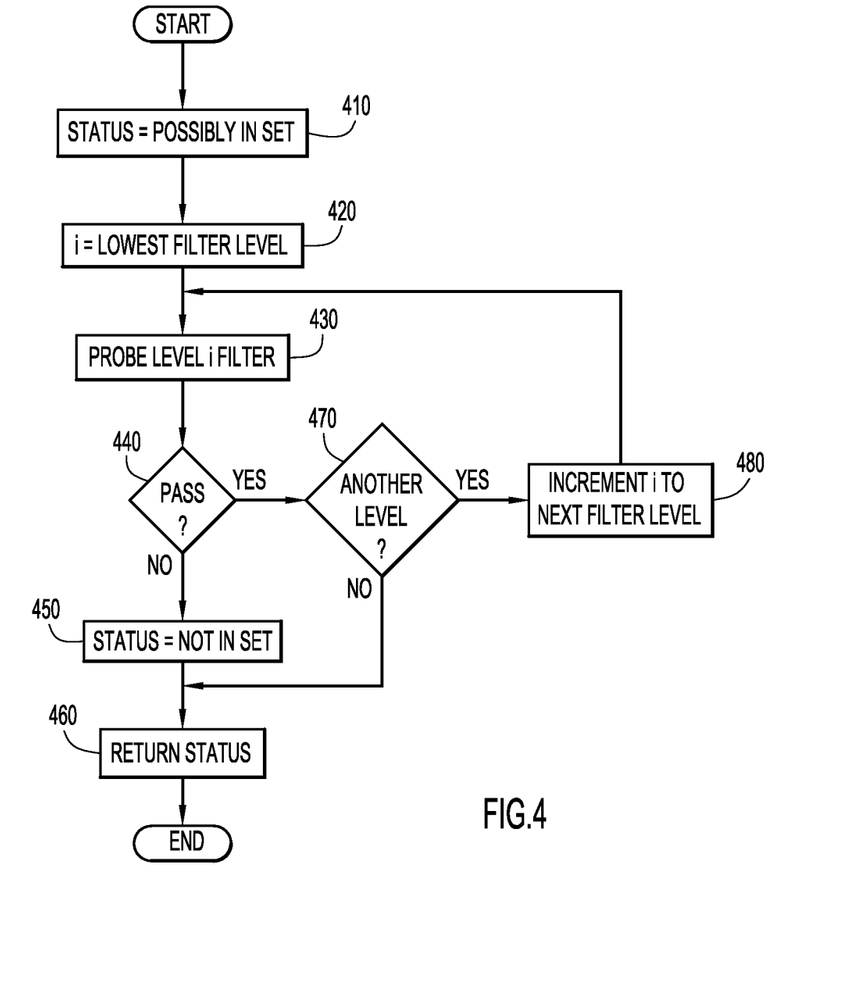
FIG. 4 is a flow diagram illustrating an example manner of probing a multilevel filter according to an embodiment of the present invention.

An example manner of using a multilevel filter to test whether an element is a member of a set (e.g., via processor(s) 20 and multilevel filter probing module 108) according to an embodiment of the present invention is illustrated in FIG. 4. In particular, at step 410 a status flag is provisionally set to indicate that the element is possibly in the set. At step 420, a current filter level i is initialized to the lowest filter level. At step 430, the filter for level i is probed to test whether the element is a member of the set. For example, if the filter for level i has the form of a bitmap built using a single hash function to set (to one) bits corresponding to elements in the set, the hash function is applied to the element, and the bit at the location indicated by the hash value is examined; a bit value of one indicates a positive result and a bit value of zero indicates a negative result.

If the result is negative as determined at step 440, the status flag is set to indicate that the element is not in the set at step 450, and the status flag is returned at step 460. If the result of the test at step 440 is positive, then it is determined at step 470 whether the current filter level is the highest filter level. If not, then the current filter level is incremented upward to the next filter level at step 480 and processing returns to step 430. For example, if the current filter level is i=2 and there is a filter for level three, i is set to three; if there is a filter for level four but not for level three, i is set to four; etc. If the current filter level is the highest filter level at step 470, processing proceeds to step 460, and the status flag (indicating that the element is possibly in the set) is returned.

In other words, the levels of a multilevel filter are probed in the reverse of the order in which they were built (e.g., smallest storage capacity to largest storage capacity, or fastest access time to slowest access time). For example, with respect to join filters, the filter at level one may be probed first, and if the result is negative, a tuple from an outer join table may be discarded immediately as a non-matching row. On the other hand, if a match is found at this level, the filter at level two is probed. As long as the lower levels of the join-filter hierarchy provide sufficiently efficient filtering, the cost of probing the multilevel join filter will be reduced. By way of illustration, an embodiment using a two-level join filter reduces the total time spent probing the join filter by 25% compared to a single level join filter for an industry standard benchmark workload, and 50% for an actual user workload.

In a multilevel filter, a lower level filter may prove to be ineffective because it is too small. On the other hand, a higher level filter may turn out to be ineffective if the lower levels have already done a good job of providing most of the filtering (e.g., allowing non-matching tuples from an outer join table to be discarded in a join operation). To minimize the cost of probing ineffective filters at any level, the effectiveness of each filter level may be measured at runtime by sampling its passing rate. If the filter at a given level turns out to be ineffective, then that filter level may be temporarily disabled.

Figure 5:
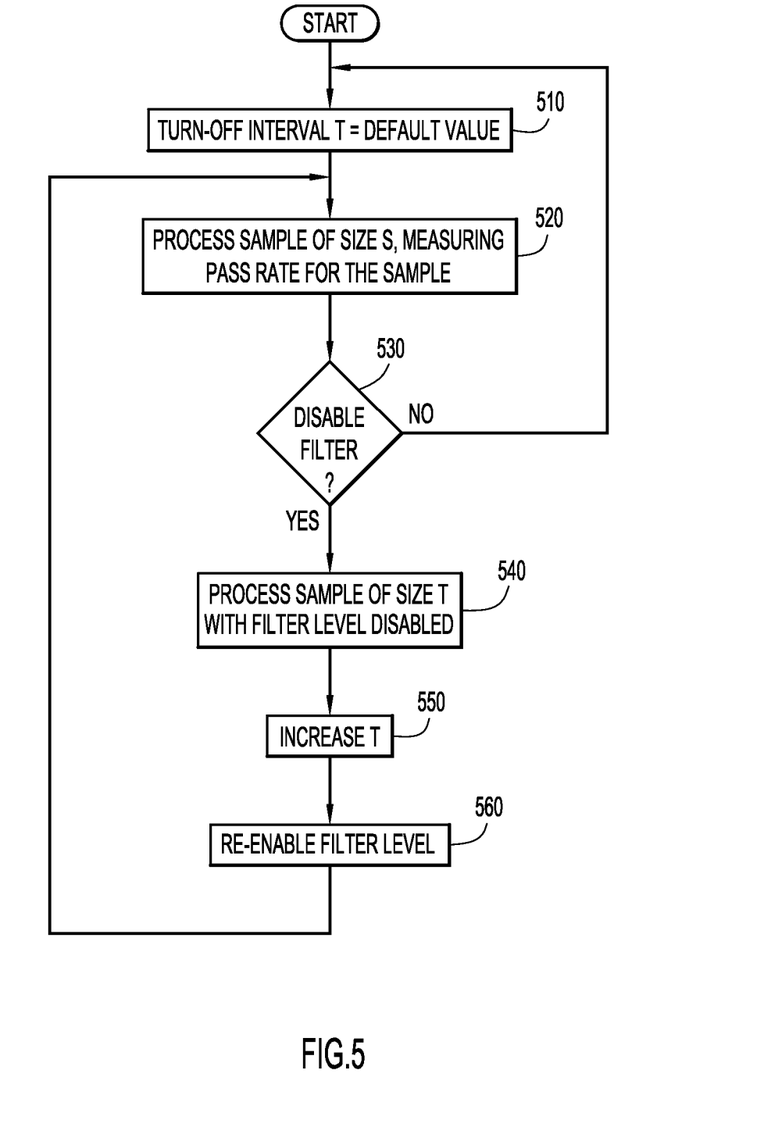
FIG. 5 is a flow diagram illustrating an example manner of dynamically disabling probes of an ineffective filter level according to an embodiment of the present invention.

An example manner of dynamically disabling use of an ineffective filter level (e.g., via processor(s) 20 and multilevel filter probing module 108) according to an embodiment of the present invention is illustrated in FIG. 5. At step 510 a turn-off interval is initialized to a default number of tests (e.g., 1K, 10K, 256K, etc.) against the filter for a given level. At step 520, a sample of S elements (e.g., 1K, 10K, 256K, etc.) are tested against the filter for the level, and the pass rate for the sample is measured. The pass rate for the sample may be measured by counting the number of elements of the sample for which the filter level indicates that the element may be a member of the set, and dividing this count by the sample size S.

At step 530, the measured pass rate is evaluated (e.g., by comparing the pass rate to a predetermined threshold) to determine whether the filter level should be disabled. If it is determined that the filter level should be disabled, a subsequent sample of size T is processed against the multilevel filter with the filter level disabled at step 540. At step 550, the turn-off interval T is increased. For example, the turn-off interval may be doubled, increased by a constant amount, or the like. The filter level is re-enabled at step 560 and processing returns to step 520. If it is determined at step 530 that the filter level should not be disabled, processing returns to step 510, and the turn-off interval is reset to the default value.

By way of example, an RDBMS may process 256K rows of a billion row outer table in a join operation and determine that the filter for a particular level is ineffective. The RDBMS may turn off the filter for that level for the next 256K rows, after which the filter for that level is re-enabled. For example, the turn-off interval may be doubled each time a sample is processed with the filter and find the filter is found to be ineffective. The turn-off interval may be reset to the default value when the filter is found to be effective. Re-enabling the join-filter is useful when the probe keys are clustered according to the layout in the table, as often happens with date or time based keys.

Use of a multilevel filter may improve the speed of a join operation. For example, in performing a join operation, an RDBMS may designate one table an outer table and another table an inner table. The RDBMS may build a hash table of rows in the inner table by hashing the key value on which the inner and outer tables are to be joined. In addition, the RDBMS may build a multilevel filter for testing whether a key appears in the inner table. The RDBMS may then loop over rows of the outer table, and for each row in the outer table, test the key value of that row against the multilevel filter. The result of the test will indicate either that the key value does not exist in the inner table, or that that the key value possibly exists in the inner table. The former result indicates that the current outer table row will not appear in the query results, and the RDBMS may proceed to the next outer table row. In the case of the latter result, the RDBMS may probe the hash table to determine which, if any, inner table rows match the current outer table row based on the join key. If, for example, one level of the multilevel filter resides in a memory cache and another resides in local memory, the cost of accessing the hash table in remote memory—and even the cost of accessing local memory—may be avoided when the multilevel filter returns a negative result.

It will be appreciated that the embodiments described above and illustrated in the drawings represent only a few of the many ways of implementing embodiments for testing set membership.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, multilevel filter generation module 106, multilevel filter generation module 108, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/ environment described above, but may be utilized for testing set membership using multilevel filters in any application program or service.

A level of a multilevel filter may have any size at least partially accommodated within the corresponding memory level. For example, a filter level size may be less than or equal to the capacity of the corresponding memory level. A filter level size may be greater than the corresponding level capacity if supported by the memory hierarchy. For example, a filter level for a memory cache may exceed the cache size (by, e.g., 1%, 5%, 10%, etc. of the cache size) at the cost of a corresponding decrease in cache hit efficiency.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for testing whether one or more items are members of a set, the system comprising:
a plurality of memories each with a corresponding storage capacity; and
at least one processor configured to:
generate a first filter associated with a first memory of the plurality of memories;
generate a second filter associated with a second memory of the plurality of memories, wherein
the first memory has a first data access speed;
the second memory has a second data access speed that is faster than the first data access speed;
each of the first and second filters comprises a Bloom filter including a data structure and each of the one or more items is associated with one or more data values in the data structures indicating absence of that item from the set, wherein respective data structures of the first and second filters comprise first and second bit maps for testing membership in the same set, wherein the second bitmap is smaller than the first bitmap, and wherein each bit of the second filter corresponds to r consecutive bits of the first filter, where r is the ratio of the two filter sizes, and
the second filter is generated with a size at least partially accommodated within the storage capacity of the second memory; and
determine absence of the one or more items from the set by selectively probing the generated filters in a descending order of data access speed of the associated memories and aborting further probing for an item in response to a probe indicating that the item is not a member of the set.

2. The system of claim 1, wherein the second filter is built by scanning segments of a previously built filter data structure in parallel, and scanning each segment comprises scanning data of that segment sequentially.

3. The system of claim 1, wherein the second filter employs a different hash function for associating items with data values in that second filter.

4. The system of claim 1, wherein:
the one or more items comprise elements of a database object;
the data structures include bitmaps; and
determining absence of the one or more items from the set comprises omitting elements of the database object in a join operation in response to an element not being a member of the set.

5. The system of claim 1, wherein generating the second filter further comprises:
determining an effectiveness of the second filter and discarding a prior generated filter in response to that second filter being effective to indicate absence of the one or more items from the set.

6. The system of claim 1, wherein the processor is further configured to:
temporarily disable one or more of the generated filters at runtime in response to that generated filter being ineffective.

7. The system of claim 1, wherein the first memory comprises a main system RAM memory and the second memory comprises a cache memory.

8. The system of claim 1, wherein the order in which the filters are probed is reversed from the order in which the associated memories are generated.

9. The system of claim 1, wherein the size of at least one of the first and second filters is based on the cardinality n of the set.

10. The system of claim 9, wherein the first filter comprises an m-bit bitmap using one or more hash functions, where m is equal to or proportional to $n \log_2 n$.

11. A computer program product for testing whether one or more items are members of a set in a system including a plurality of memories each with a corresponding storage capacity, comprising:
a computer readable storage medium having computer readable program code embodied therewith for execution on a processing system, the computer readable program code comprising computer readable program code configured to:
generate a first filter associated with a first memory of the plurality of memories;
generate a second filter associated with a second memory of the plurality of memories, wherein
the first memory has a first data access speed;
the second memory has a second data access speed that is faster than the first data access speed;
each of the first and second filters comprises a Bloom filter including a data structure and each of the one or more items is associated with one or more data values in the data structures indicating absence of that item from the set, wherein respective data structures of the first and second filters comprise first and second bit maps for testing membership in the same set, wherein the second bitmap is smaller than the first bitmap, and wherein each bit of the second filter corresponds to r consecutive bits of the first filter, where r is the ratio of the two filter sizes, and
the second filter is generated with a size at least partially accommodated within the storage capacity of the second memory; and
determine absence of the one or more items from the set by selectively probing the generated filters in a descending order of data access speed of the associated memories and aborting further probing for an item in response to a probe indicating that the item is not a member of the set.

12. The computer program product of claim 11, wherein the second filter is built by scanning segments of a previously built filter data structure in parallel, and scanning each segment comprises scanning data of that segment sequentially.

13. The computer program product of claim 11, wherein the second filter employs a different hash function for associating items with data values in that second filter.

14. The computer program product of claim 11, wherein:
the one or more items comprise elements of a database object;
the data structures include bitmaps; and
determining absence of the one or more items from the set comprises omitting elements of the database object in a join operation in response to an element not being a member of the set.

15. The computer program product of claim 11, wherein generating the second filter further comprises:
determining an effectiveness of the second filter and discarding a prior generated filter in response to that second filter being effective to indicate absence of the one or more items from the set.

16. The computer program product of claim 11, wherein the computer readable program code is further configured to:
temporarily disable one or more of the generated filters at runtime in response to that generated filter being ineffective.

17. The computer program product of claim 11, wherein generating the second filter further comprises determining that a filter having a lesser storage capacity and faster data access speed than the first filter is likely to be effective, and building that filter in response to that determination.

18. The computer program product of claim 11, wherein the first memory comprises a main system RAM memory and the second memory comprises a cache memory.

19. The computer program product of claim 11, wherein the order in which the filters are probed is reversed from the order in which the associated memories are generated.

* * * * *